(12) United States Patent
Balensiefer et al.

(10) Patent No.: US 7,059,677 B2
(45) Date of Patent: Jun. 13, 2006

(54) JUVENILE BOOSTER SEAT WITH TILTABLE BASE

(75) Inventors: Eugene Roy Balensiefer, Seymour, IN (US); Philip W. Burbrink, Columbus, IN (US); Trevor Brown, Salem, IN (US)

(73) Assignee: Cosco Management, Inc., Wilmington, DE (US)

( * ) Notice: Subject to any disclaimer, the term of this patent is extended or adjusted under 35 U.S.C. 154(b) by 24 days.

(21) Appl. No.: 10/873,368

(22) Filed: Jun. 22, 2004

(65) Prior Publication Data

US 2005/0151402 A1     Jul. 14, 2005

Related U.S. Application Data

(60) Provisional application No. 60/535,239, filed on Jan. 9, 2004.

(51) Int. Cl.
 *A47C 1/08* (2006.01)
(52) U.S. Cl. .............................. 297/256.13; 297/256.1; 297/256.16
(58) Field of Classification Search ................ 297/130, 297/256.1, 256.13, 256.16, 250.1
See application file for complete search history.

(56) References Cited

U.S. PATENT DOCUMENTS

| | | | |
|---|---|---|---|
| 5,746,478 A * | 5/1998 | Lumley et al. | 297/256.13 |
| 5,836,650 A * | 11/1998 | Warner et al. | 297/256.11 |
| 6,000,753 A | 12/1999 | Cone | |
| 6,139,101 A | 10/2000 | Berringer et al. | |
| 6,199,949 B1 * | 3/2001 | DaSilva | 297/256.12 |
| 6,299,249 B1 | 10/2001 | Mori | |
| 6,428,100 B1 | 8/2002 | Kain et al. | |
| 6,505,887 B1 * | 1/2003 | Hampton | 297/256.1 |
| 6,554,358 B1 | 4/2003 | Kain | |
| 6,572,189 B1 * | 6/2003 | Blaymore | 297/256.12 |
| 6,626,493 B1 * | 9/2003 | Kain | 297/250.1 |
| 6,908,151 B1 * | 6/2005 | Meeker et al. | 297/250.1 |

* cited by examiner

*Primary Examiner*—Peter M. Cuomo
*Assistant Examiner*—Erika Garrett
(74) *Attorney, Agent, or Firm*—Barnes & Thornburg LLP

(57) ABSTRACT

A booster seat includes a juvenile seat configured to mount on a tiltable base. By adjusting the tilting orientation of the base relative to an underlying vehicle seat, a caregiver can control the orientation of the juvenile seat relative to the underlying vehicle seat.

35 Claims, 7 Drawing Sheets

JUVENILE BOOSTER SEAT WITH TILTABLE BASE

This application claims priority under 35 U.S.C. § 119(e) to U.S. Provisional Application Ser. No. 60/535,239, filed Jan. 9, 2004, which is expressly incorporated by reference herein.

BACKGROUND

The present disclosure relates to a base for a juvenile booster seat, and particularly to a seat base that mounts and supports a juvenile seat on a seat in a vehicle. More particularly, the present disclosure relates to a seat base configured to tilt to orient a juvenile seat mounted on the seat base in a desired manner.

Juvenile seats are widely used to transport young children in automobiles and other vehicles. An infant vehicle seat with tiltable base is disclosed in U.S. Pat. No. 6,554,358, which patent is hereby incorporated by reference herein.

SUMMARY

According to the present disclosure, a tiltable base is adapted to rest on a vehicle seat and support a juvenile seat unit in a desired position with respect to the underlying vehicle seat. The base includes a support foundation adapted to set on a vehicle seat and a seat support movable relative to the support foundation and adapted to support a child or a juvenile seat unit. A releasable lock mechanism is also included in the base to retain the seat support in selected tilting and non-tilting positions relative to the support foundation. Upon release of the lock mechanism, the seat support is freed to move to another position relative to the underlying support foundation.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 3 is an enlarged exploded assembly view of several components included in the tiltable base of the present vehicle booster seat kit showing a seat support including an upper and lower shell, a support foundation configured to be mounted in the seat support, an actuator including a pull handle and an anchor grip including two fastener arms cantilevered to the pull handle and sized to fit into two channels formed in the support foundation and an L-shaped anchor including an anchor rod adapted to mount on the support foundation and extend through each of the channels, and a pair of springs for yieldably biasing the actuator in a direction toward the support foundation to cause portions of the anchor rod to fit into notches formed in the fastener arms to retain the seat support in a selected tilted position relative to the support foundation as suggested, for example, in FIGS. 10 and 12;

DETAILED DESCRIPTION

Figures 1, 2:
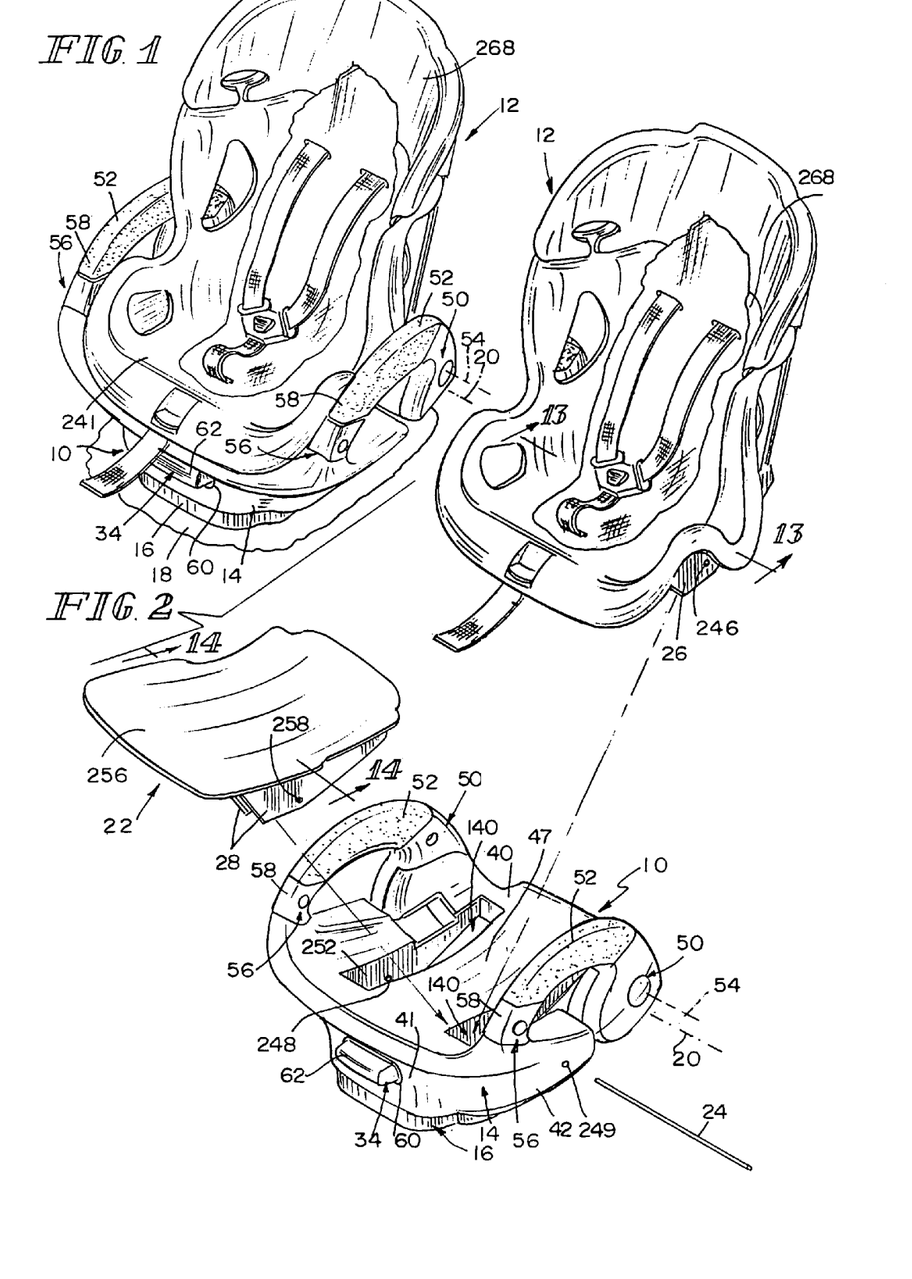
FIG. 1 is a perspective view of a high back juvenile seat mounted on a tiltable base and nested within armrests included in the tiltable base.
FIG. 2 is an exploded perspective assembly view of an unassembled booster seat kit comprising a tiltable base, a "high back" juvenile seat adapted to be retained either in forwardly or rearwardly facing positions on a seat support included in the base using a retainer rod adapted to slide through apertures formed in the base and seat as shown, for example, in FIG. 13, and a "backless" juvenile saddle configured to provide an alternative to the high back juvenile seat and also adapted to be retained in a mounted position on the seat support included in the base using that retainer rod as shown, for example, in FIG. 14.

A tiltable base 10 for supporting a seat unit such as a "high back" juvenile seat 12 in a desired leveled or inclined position on an underlying vehicle seat 18 or other surface is shown in FIGS. 1 and 2. An alternative seat unit such as a "backless" juvenile saddle 22 can also be supported on tiltable base 10. It is also within the scope of this disclosure to configure tiltable base 10 to support a seated child thereon without using any additional seat unit such as seat 12 or saddle 22.

Figures 7, 8:
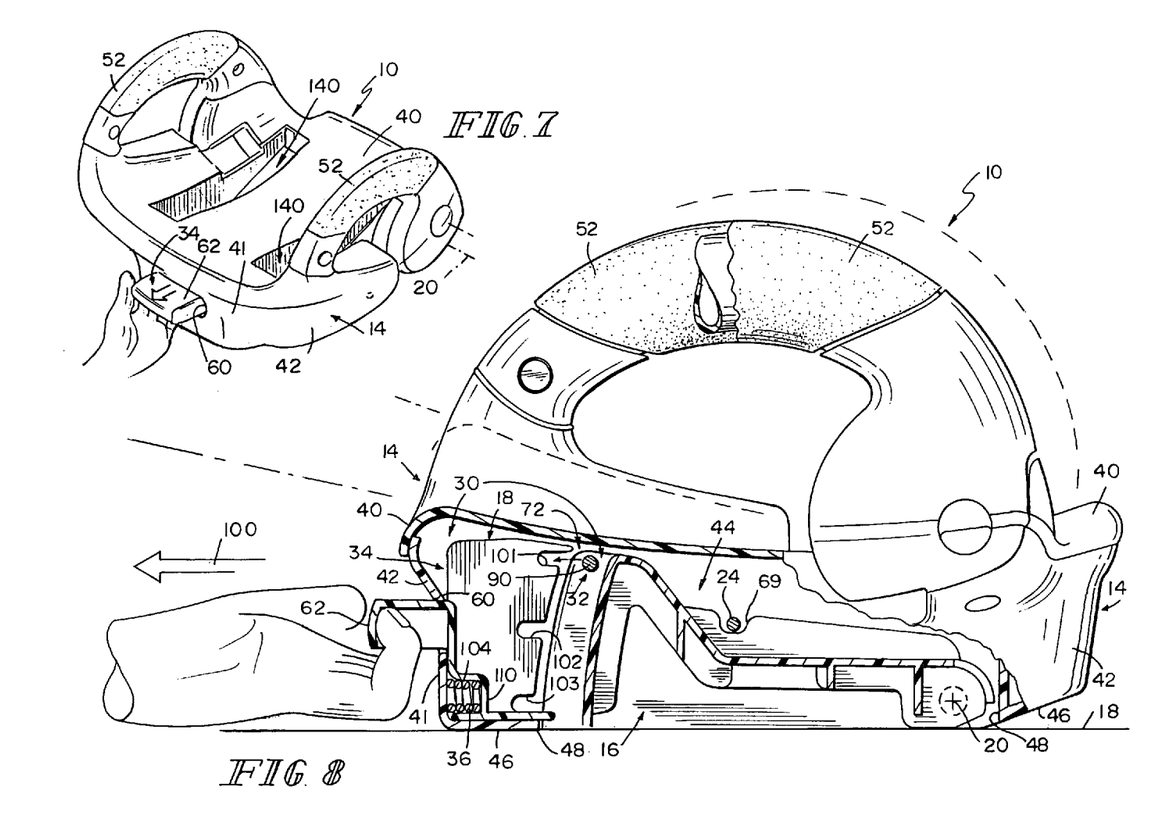
FIG. 7 is a perspective view of the tiltable base of FIGS. 1 and 2 showing the seat support in a "lowered" position relative to the support foundation and showing outward movement of the actuator toward a release position.
FIG. 8 is an enlarged side elevation view of the tiltable base of FIG. 7, with portions broken away, showing movement of the second fastener arm against the spring bearing on the second fastener arm to disengage the anchor rod from a first notch formed in the second fastener arm to free the seat support to pivot about a rear pivot axis relative to the support foundation to, for example, an "intermediate" position shown in FIGS. 9 and 10, and a "raised" position shown in FIGS. 11 and 12.
Figures 9, 10:
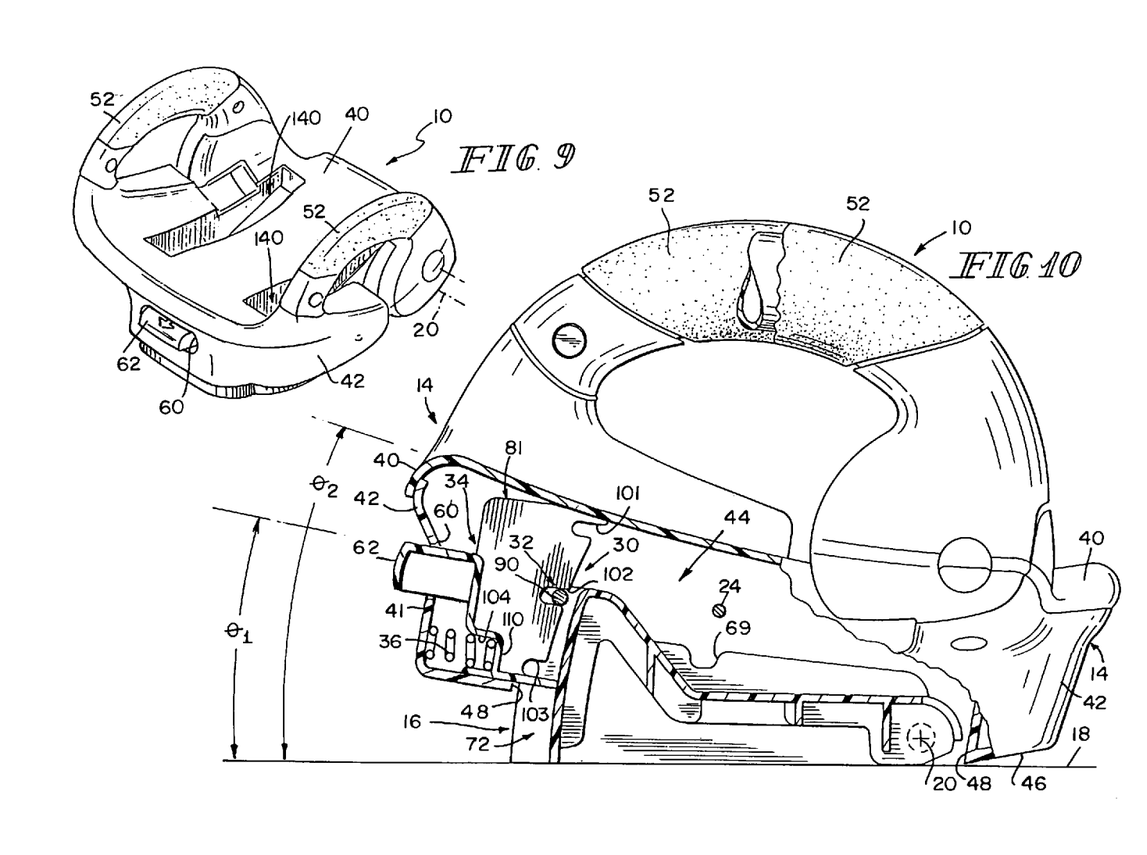
FIG. 9 is a view similar to FIG. 7 showing the seat support after it has been tilted upwardly to assume an intermediate position.
FIG. 10 is an enlarged side elevation view of the tiltable base of FIG. 9, with portions broken away, showing engagement of the anchor rod in a second notch formed in the second fastener arm to establish the intermediate position.
Figures 11, 12:
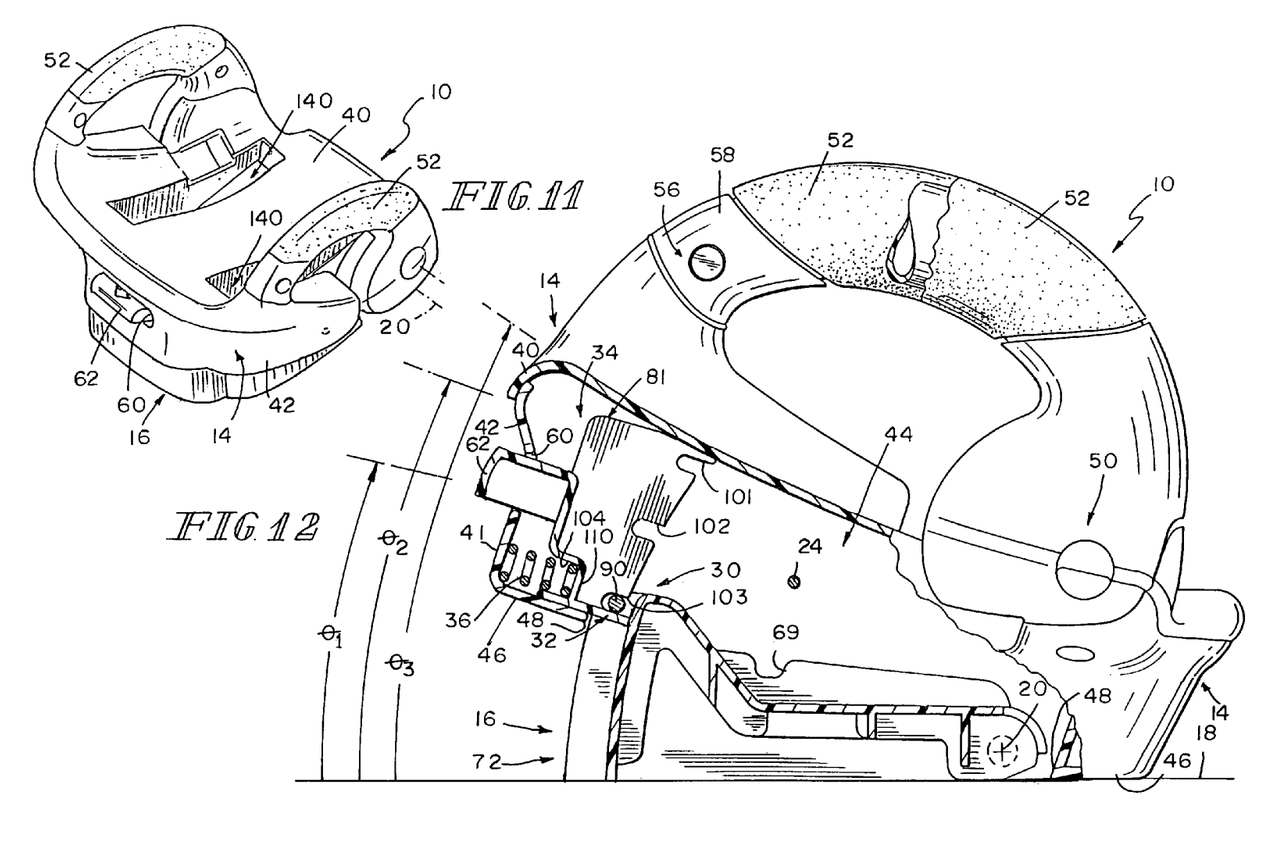
FIG. 11 is a view similar to FIGS. 7 and 9 showing the seat support after it has been tilted upwardly further to assume a raised position.
FIG. 12 is an enlarged side elevation view of the tiltable base of FIG. 11, with portions broken away, showing engagement of the anchor rod in a third notch formed in the second fastener arm to establish the raised position.

Tilting operation of base 10 is shown, for example, in FIGS. 7–12 to illustrate movement of a seat support 14 (adapted to carry high back juvenile seat 12 thereon) relative to an underlying support foundation 16 from a "lowered" position shown in FIGS. 7 and 8 to an "intermediate" position shown in FIGS. 9 and 10, and to a "raised" position shown in FIGS. 11 and 12. Tiltable base 10 can be adjusted by a caregiver to assume, for example, one of the foregoing "tilt" orientations to place high back juvenile seat 12 in a somewhat "level" or desired orientation regardless of the angle of inclination of the vehicle seat 18 underlying tiltable base 10. It is within the scope of this disclosure to provide any number of predetermined orientations of seat support 14 relative to support foundation 16 in lieu of the three orientations disclosed herein.

In the illustrated embodiment, seat support 14 is "tiltable" about a rear pivot axis 20 as suggested in FIGS. 3 and 7–12 and configured to carry either high back juvenile seat 12 or a backless juvenile saddle 22 at the option of a user as suggested in FIG. 2. High back juvenile seat 12 is adapted to mount on tiltable seat support 14 to lie either in a forwardly facing position as shown in FIG. 1 or in a rearwardly facing position (not shown). By adjusting the "tilt angle" of seat support 14 relative to support foundation 16, it is possible to vary orientation of high back juvenile seat 12 (or backless juvenile saddle 22) on seat support 14 from an "upright" orientation to a "reclined" orientation regardless of the angle of inclination of underlying vehicle seat 18.

Figure 13:
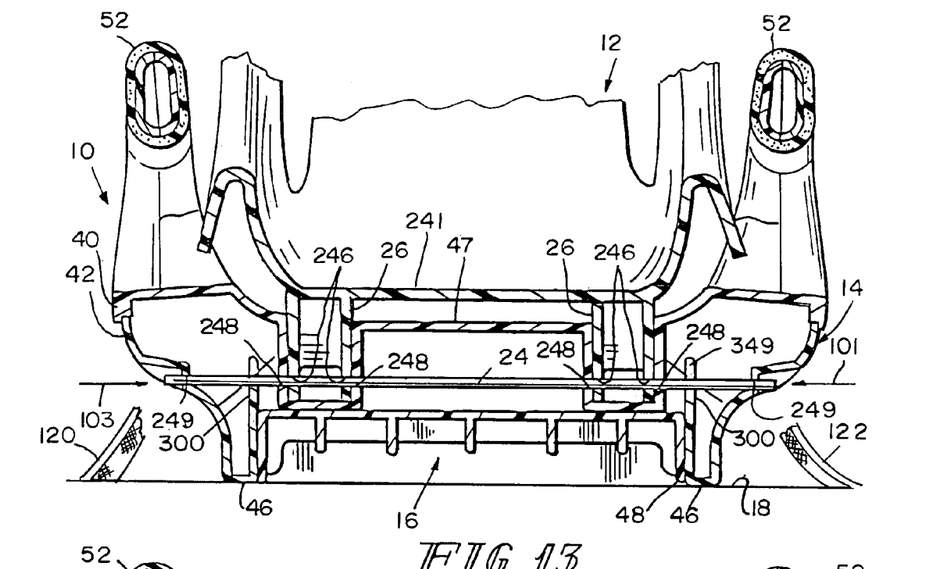
FIG. 13 is an enlarged sectional view taken along line 13—13 of FIG. 2 showing the high back juvenile seat in place on the tiltable base and showing nesting of the high back juvenile seat between armrests included in the tiltable base and showing nesting of two feet on the underside of the high back juvenile seat in two companion foot receivers formed in the seat support to orient the high back juvenile seat properly on the seat support and passage of the retainer rod through apertures formed in the feet and seat support to retain the high back juvenile seat in place on the seat support.
Figure 14:
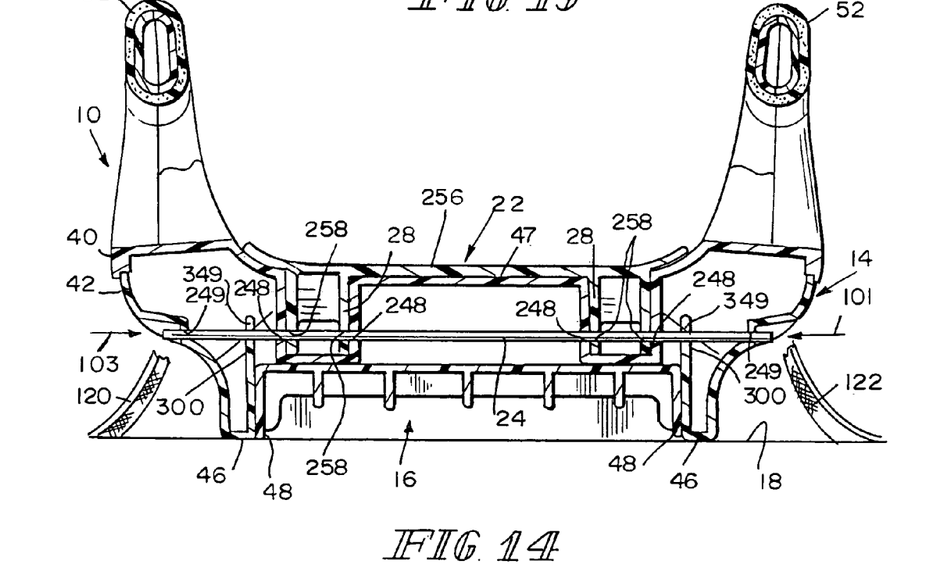
FIG. 14 is an enlarged sectional view taken along line 14—14 of FIG. 2 showing the backless juvenile saddle in place on the tiltable base and showing nesting of two feet on the underside of the backless juvenile saddle in two companion foot receivers formed in the seat support to orient the backless juvenile saddle properly on the seat support and showing passage of the retainer rod through apertures formed in the feet and seat support to retain the backless juvenile saddle in place on the seat support.

A retainer rod 24 shown in FIG. 2 is sized and arranged to pass through apertures formed in seat support 14 and in feet 26 in high back juvenile seat 12 (or feet 28 in backless juvenile saddle 22) to retain high back juvenile seat 12 (or backless juvenile saddle 22) in place on seat support 14 as suggested, for example, in FIG. 13 (or 14). Means, such as flexible retainer tabs (not shown) are provided in a tiltable base 10 for retaining retainer rod 24 in place following assembly of the components used to produce tiltable base 10.

Figure 3:
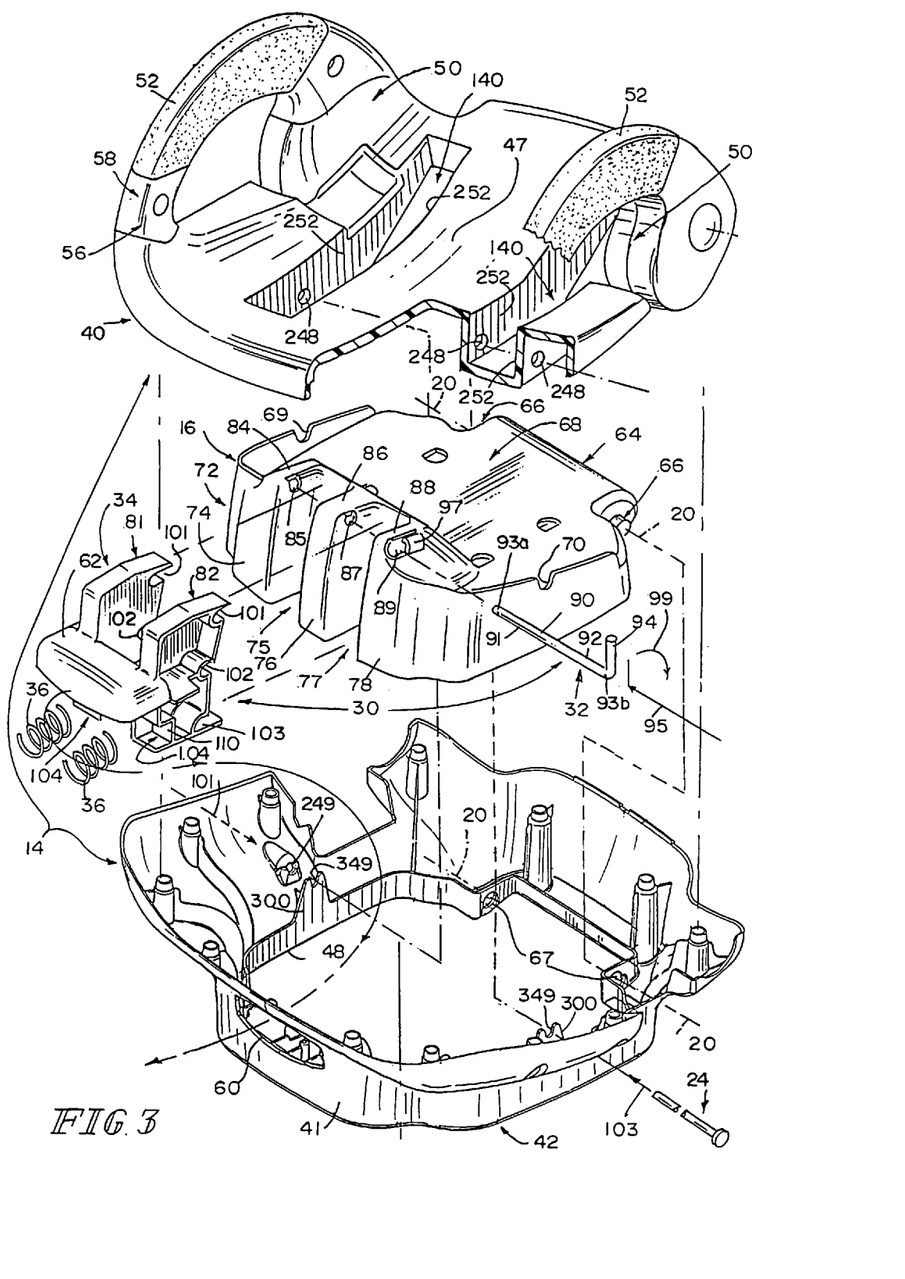

As suggested in FIG. 3, tiltable base 10 includes seat support 14, support foundation 16, and a releasable lock mechanism 30. Releasable lock mechanism 30 comprises an anchor 32 adapted to be mounted on support foundation 16 (as shown, for example, in FIGS. 4–6), an actuator 34 adapted to be mounted on seat support 14 for movement between locking positions (shown, for example, in FIGS. 10 and 12) and lock-releasing positions (shown, for example, in FIG. 8), and springs 36 arranged to bias actuator 34 to mate with anchor 32 to retain seat support 14 in a selected tilting or non-tilting position relative to support foundation 16. In the illustrated embodiment, actuator 34 includes a pull handle 62 and an anchor grip coupled to pull handle 52 and configured to include first and second fastener arms 81, 82 configured to mate with anchor 32 as suggested, for example, in FIGS. 10 and 12.

Seat support 14 includes an upper shell 40 that mates with a lower shell 42 to form an interior region 44 receiving support foundation 16 therein as suggested, for example, in FIGS. 3, 8, 10, and 12. Lower shell 42 includes a bottom wall 46 formed to include an opening 48 through which support foundation 16 can extend as seat support 14 is moved relative to support foundation 16 from a lowered position as shown in FIG. 8 to tilted positions shown in FIGS. 10 and 12. Fasteners (not shown) are used to retain upper and lower shells 40, 42 in mated relation once releasable lock mechanism 30 and support foundation 16 are located properly in the space provided between upper and lower shells 40, 42.

A seat unit (e.g., high back juvenile seat 12 or juvenile saddle 22) mounted on upper shell 40 to overlie a seating surface 47 of upper shell 40 and retainer 24 is coupled to the seat unit and to upper shell 40 to retain the seat unit in a fixed position on tiltable base 10. In the illustrated embodiment, retainer 24 is also coupled to lower shell 42. Each of the seat unit, upper shell 40, and lower shell 42 is formed to include retainer-receiving apertures. Retainer 24 is a rod sized to slide through the retainer-receiving apertures formed in the seat unit, upper shell 40, and lower shell 42 to retain the seat unit in a fixed position on upper shell 40.

The seat unit includes a seat bottom and a foot coupled to the seat bottom and formed to include at least one retainer-receiving aperture through which retainer rod 24 passes. Upper shell 40 is formed to include a pair of foot receivers 140 and each foot in the seat unit (e.g., seat 12 or saddle 22) extends into one of foot receivers 140 to establish a selected location of the seat unit relative to upper shell 40 of the tiltable base 10.

Upper shell 40 includes a side wall 252 arranged to depend from seating surface 47 of upper shell 40 to define a boundary of foot receiver 140 and formed to include a retainer-receiving aperture 248 through which the retainer rod 24 passes. In the illustrated embodiment, retainer rod 24 is inserted (as suggested in FIG. 13) in one of directions 101 and 103 through a pair of retainer-receiving apertures 246 formed in each foot 26 of high back juvenile seat 12, a pair of retainer-receiving apertures 248 formed in side walls 252 associated with each foot receiver 140, and a pair of retainer-receiving apertures 249 formed in seat support 14. In the illustrated embodiment, retainer-receiving apertures 249 are formed in lower shell 42 as suggested in FIGS. 3, 13, and 14. As shown in FIG. 3, lower shell 42 also includes a pair of spaced-apart upright retainer supports 300 located in interior region 44 of seat support 14 and formed to include retainer notches 349 for receiving portions of retainer rod 24 therein when retainer rod 24 is mounted in seat support 14 in the manner described herein. In the case of backless juvenile saddle 22, retainer rod 24 passes through retainer-receiving apertures 258 formed in each foot 28 of saddle 22 as shown, for example, in FIG. 14 in addition to the apertures 248 and 249 identified above.

In illustrative embodiments, the seat unit is a high back juvenile seat 12 including a seat back 268 extending upwardly from a seat bottom 241 and a pair of feet 26 extends downwardly from seat bottom 241 in a direction away from the seat back 268. In other illustrative embodiments, the seat unit is a backless juvenile saddle 22 including a saddle plate 256 and a pair of feet 28 coupled to an underside of the saddle plate 256. It is within the scope of this disclosure to provide a relatively short upwardly extending portion or seat back (not shown) along a rear edge of juvenile saddle 22.

Upper shell 40 is formed to include armrest pivot support 50 for supporting each armrest 52 included in tiltable base 10 for pivotable movement about pivot axis 54 and armrest retainers 56 for releasably retaining a free end 58 of each armrest 52 normally in a locked position. Lower shell 42 includes a front panel 41 that is also formed to include a handle-receiving aperture 60 sized to allow movement of a pull handle 62 included in actuator 34 therethrough as suggested, for example, in FIGS. 8, 10, and 12.

As suggested in FIG. 3, support foundation 16 includes a rear portion 64 formed to include a pivot support 66 configured to mate with seat support 14 at support mounts 67 to establish rear pivot axis 20. Support foundation 16 also includes a middle portion 68 formed to include spaced-apart notches 69, 70 for receiving retainer rod 24 therein as suggested in FIGS. 3 and 8. Support foundation 16 also includes a front portion 72 configured to carry anchor 32 as suggested in FIGS. 3–6 and mate with actuator 34 as suggested in FIGS. 8, 10, and 12.

As shown, for example, in FIG. 3, front portion 72 of support foundation 16 includes a first frame member 74 and a channel partition 76 which cooperate to define a first arm-receiving channel 75 therebetween. Front portion 72 also includes a second frame member 78 that cooperates with channel partition 76 to define a second arm-receiving channel 77 therebetween. These channels 75, 77 extend vertically and are sized to receive, respectively, first and second fastener arms 81, 82 of actuator 34 therein during mating engagement of fastener arms 81, 82 and portions of anchor 32 as suggested, for example, in FIGS. 10 and 12. Fastener arms 81, 82 are sized and arranged to slide up and down in channels 75, 77 as seat support 14 is pivoted about rear pivot axis 20 to move relative to support foundation 16 as suggested, for example, in FIGS. 8, 10, and 12.

Figure 4:
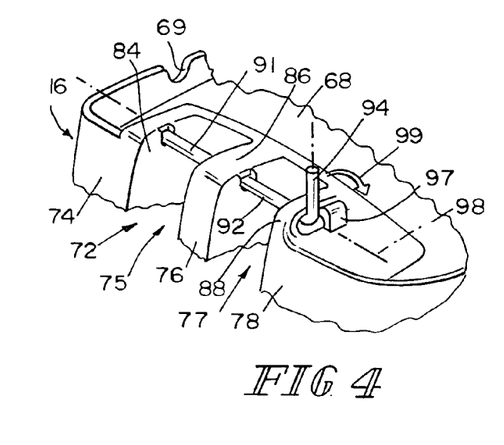
FIG. 4 is an enlarged perspective view of a portion of the support foundation of FIG. 3 showing insertion of the anchor rod into rod mount holes formed in the support foundation.
Figure 5:
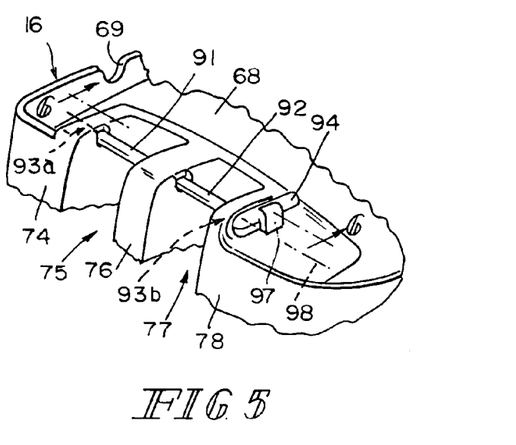
FIG. 5 is a view similar to FIG. 4 showing rotation of the anchor rod to cause a rod handle appended to one end of the anchor rod to mate with a handle retainer included in the support foundation.
Figure 6:
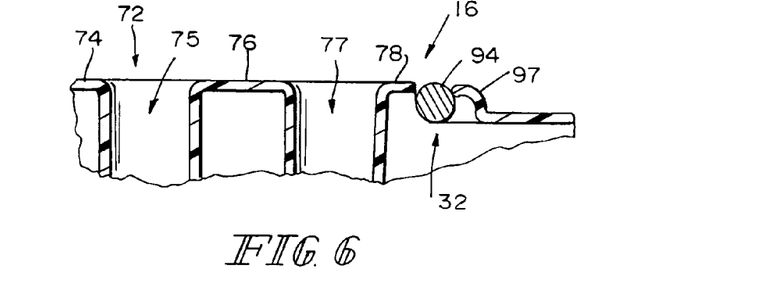
FIG. 6 is a sectional view taken along line 6—6 of FIG. 5.

As shown in FIGS. 3–5, in an illustrative embodiment, first rod mount 84 is provided in an upper portion of first frame member 74 and is formed to include a passageway 85 receiving a free end 93a of anchor rod 90 included in anchor 32 therein. A center rod mount 86 is provided in an upper portion of channel partition 76 and is formed to include a passageway 87 receiving a middle portion of anchor rod 90 therein. A second rod mount 88 is provided in an upper portion of second frame member 78 and is formed to include a passageway 89 receiving a proximal portion 93b of anchor rod 90 therein. When anchor 32 is arranged to extend through the passageways 85, 87, 89 formed, respectively, in mounts 84, 86, 88, then first and second portions 91, 92 of anchor rod 90 traverse portions of first and second arm-receiving channels 75, 77 and are exposed to first and second fastener arms 81, 82 of actuator 34 during movement of those fastener arms 81, 82 into the channels 75, 77, as suggested, for example, in FIGS. 4 and 5.

Anchor 32 includes anchor rod 90 and rod handle 94 and is L-shaped in the illustrated embodiment as shown, for example, in FIG. 3. To mount anchor 32 on support foundation 16, anchor rod 90 is first moved in direction 95 to cause the free end 93a thereof to pass in sequence through passageways 89, 87, and 85 while rod handle 94 is arranged to extend upwardly as suggested in FIGS. 3 and 4. Then rod handle 94 is moved to mate with a "snap-fit" handle retainer 97 formed in support foundation 16 by rotating anchor rod 90 about axis 98 in rotary direction 99. It is within the scope of this disclosure to mount anchor 32 on support foundation 16 to communicate with channels 75, 77 and/or mate with fastener arms 81, 82 in other suitable manners. Once anchor rod 90 is mounted on support foundation 16, exposed first and second portions 91, 92 traversing channels 75, 77 are arranged to mate with first and second fastener arms 81, 82 included in actuator 34.

Actuator 34 includes a pull handle 62 and first and second fastener arms 81, 82 coupled (e.g., cantilevered) to an inner end of pull handle 62 as suggested in FIG. 3. Pull handle 62 is configured to be gripped and pulled by a user in a direction 100 away from rear pivot axis 20 as suggested in FIGS. 7 and 8. Each of fastener arms 81, 82 includes, for example, first, second, and third notches 101, 102, 103 sized to receive exposed first and second rod portions 91, 92 of anchor rod 90 therein. Each fastener arm 81, 82 also includes a spring receiver 104 configured to receive an inner end of spring 36 as suggested in FIGS. 8, 10, and 12. When assembled, fastener arms 81, 82 and anchor rod 90 are positioned to lie in a space between pull handle 62 and rear pivot axis 20 as suggested in FIGS. 8, 10, and 12.

Tiltable base 10 is shown in a lowered position in FIGS. 7 and 8. Initially, exposed portions 91, 92 of anchor rod 90 fit into first notches 101 of spring-biased actuator 34 to retain seat support 14 in this lowered position relative to support foundation 16. To release lock mechanism 30 so that seat support 14 can be tilted about rear pivot axis 20 relative to support foundation 16, a user pulls handle 62 in direction 100 to compress springs 36 between inner walls 110 of spring receivers 104 of actuator 34 and front panel 41 of lower shell 42 to cause fastener arms 81, 82 to move in direction 100 to disengage anchor rod 90 as shown, for example, in FIG. 8. Then seat support 14 can be pivoted upwardly about rear pivot axis 20 to assume an intermediate position shown in FIG. 10 wherein anchor rod 90 fits into second notches 102 formed in fastener arms 81, 82 of actuator 34 or to assume a raised position shown in FIG. 12 wherein anchor rod 90 fits into third notches 103 formed in fastener arms 81, 82 of actuator 34.

Tiltable base 10 and saddle 22 can cooperate to provide a backless booster seat for use in a vehicle. Alternatively, tiltable base 10 and juvenile seat 12 can cooperate to provide a forward-facing seat or a rearward-facing seat, depending upon the orientation of juvenile seat 12 on tiltable base 10.

In use, tiltable base 10 (with either juvenile seat 12 or saddle 22 mounted thereon) is placed on top of a vehicle seat 18. Suitable belts 120, 122 are used to retain tiltable base 10 in place on vehicle seat 18 as suggested in FIGS. 13 and 14.

Vehicle seats in the industry vary in design and may be designed to have a top surface that is substantially horizontal or that is inclined at a certain inclination angle. By tilting seat support 14 relative to support foundation 16 while seat foundation 16 is in place on vehicle seat 18, a user may move juvenile seat 12 or saddle 22 to assume a desired orientation.

Once tiltable base 10 is placed on vehicle seat 18, tiltable base 10 can be arranged to assume a desired tilting or non-tilting configuration by pulling handle 62 away from exposed front portion 72 of support foundation 16, thereby disengaging fastener arms 81, 82 and anchor rod 90. Seat support 14 is now free to pivot about the rear pivot axis 20 relative to support foundation 16 on vehicle seat 18 through, for example, angles $\theta_1$, $\theta_2$, and $\theta_3$, to selectable positions as shown, for example, in FIGS. 7–12.

The invention claimed is:

1. A tiltable base for supporting a child in a seated position in a vehicle, the tiltable base comprising
   a seat support adapted to carry a seated child,
   a support foundation including a rear portion coupled to the seat support for pivotable movement about a pivot axis and a front portion arranged to lie in spaced-apart relation to the rear portion, and a releasable lock mechanism including an anchor coupled to the front portion of the support foundation and an actuator including an anchor grip positioned to lie between a front panel of the seat support and the front portion of the support foundation and mounted on the seat support for movement between locking positions to mate with the anchor to retain the seat support in a selected angular orientation relative to the support foundation and lock-releasing positions to disengage the anchor to allow movement of the seat support relative to the support foundation about the pivot axis.

2. The tiltable base of claim 1, wherein the front panel of the seat support is formed to include a handle-receiving aperture and the actuator further includes a pull handle positioned to lie in spaced-apart relation to the anchor to locate the anchor grip therebetween and arranged to extend through the handle-receiving aperture formed in the front panel.

3. The tiltable base of claim 2, wherein the seat support includes an upper shell including a seating surface and a lower shell arranged to cooperate with the upper shell to form an interior region under the seating surface, the support foundation is arranged to extend into the interior region of the seat support under the seating surface through a bottom opening formed in the lower shell, and the front panel providing the handle-receiving aperture is included in the lower shell.

4. The tiltable base of claim 3, wherein the releasable lock mechanism further includes a spring arranged to act against the front panel of the lower shell to bias the actuator normally to move to assume one of the locking positions.

5. The tiltable base of claim 3, further comprising a pair of armrests coupled to the upper shell and arranged to lie in spaced-apart relation to one another and wherein the upper shell is formed to include a foot receiver having an opening in the seating surface and defining means for receiving a portion of a separate juvenile vehicle seat placed on the seating surface of the seat support to lie between the pair of armrests.

6. The tiltable base of claim 2, wherein the anchor grip is formed to include vertically spaced-apart first, second, and third notches and each of the notches is arranged to face away from the pull handle and sized to receive an exposed portion of the anchor therein upon pivoting movement of the seat support about the pivot axis to a selected angular orientation relative to the support foundation.

7. The tiltable base of claim 6, wherein the releasable lock mechanism further includes a spring arranged to act against the front panel of the seat support to bias the actuator normally to move to assume one of the locking positions and the anchor grip is formed to include a spring receiver configured to receive an inner end of the spring and an inner wall arranged to define a boundary of the spring receiver and to engage the inner end of the spring.

8. The tiltable base of claim 6, wherein the front portion of the support foundation is formed to include an anchor grip-receiving channel, the exposed portion of the anchor is arranged to traverse the anchor grip-receiving channel, and the anchor grip is sized and arranged to slide up and down in the anchor grip-receiving channel as the seat support is pivoted about the pivot axis to move relative to the support foundation.

9. The tiltable base of claim 2, wherein the releasable lock mechanism further includes a spring arranged to act against the front panel of the seat support to bias the actuator normally to move to assume one of the locking positions.

10. The tiltable base of claim 9, wherein the spring is arranged to lie below the pull handle.

11. The tiltable base of claim 9, wherein the seat support is formed to include an upwardly facing seating surface and the pull handle is arranged to lie in a space above the spring and below the upwardly facing seating surface upon mating engagement of the anchor grip and the anchor.

12. The tiltable base of claim 1, wherein the anchor grip includes a first fastener arm arranged to extend in a first direction from the front panel toward the front portion of the support foundation, the first fastener arm is formed to include notches, and each notch is sized to receive a first exposed portion of the anchor therein upon pivoting movement of the seat support about the pivot axis to a selected angular orientation relative to the support foundation.

13. The tiltable base of claim 12, wherein the releasable lock mechanism further includes a spring arranged to bias the actuator normally to move toward the support foundation to position the exposed portion of the anchor in one of the notches to establish one of the locking positions and the first fastener arm includes a spring receiver arranged to open in a direction facing away from the support foundation and sized to receive an inner end of the spring.

14. The tiltable base of claim 13, wherein the spring further includes an opposite outer end arranged to engage the front panel of the seat support.

15. The tiltable base of claim 12, wherein the front portion of the support foundation is formed to include an arm-receiving channel, the first exposed portion of the anchor is arranged to traverse the arm-receiving channel, and the first fastener arm is sized and arranged to slide up and down in the arm-receiving channel as the seat support is pivoted about the pivot axis to move relative to the support foundation.

16. The tiltable base of claim 12, wherein the anchor grip further includes a second fastener arm arranged to extend in the first direction from the front panel toward the front portion of the support foundation and lie in laterally spaced-apart relation to the first fastener arm, the second fastener arm is formed to include notches, each notch is sized to receive a second exposed portion of the anchor therein upon pivoting movement of the seat support about the pivot axis to a selected angular orientation relative to the support foundation, the front portion of the support foundation is formed to include first and second arm-receiving channels and a channel partition located between the first and second arm-receiving channels and coupled to the anchor to locate the first exposed portion of the anchor in the first arm-receiving channel and to locate the second exposed portion of the anchor in the second arm-receiving channel, the first fastener arm extends into the first arm-receiving channel to mate with the first exposed portion of the anchor, and the second fastener arm extends into the second arm-receiving channel to mate with the second exposed portion of the anchor.

17. The tiltable base of claim 16, wherein the front portion of the support foundation includes a channel partition, first frame member that cooperates with the channel partition to define the first arm-receiving channel therebetween, and a second frame member that cooperates with the channel partition to define the second arm-receiving channel therebetween and the anchor includes an anchor rod that is arranged to extend through rod mounts formed in the channel partition and the first and second frame members to define the first and second exposed portions of the anchor.

18. The tiltable base of claim 1, wherein the support foundation is formed to include two rod mounts arranged to lie in spaced-apart relation to one another and a channel located between the two rod mounts, the anchor is L-shaped and includes an anchor rod arranged to pass through the two rod mounts and traverse the channel to define an exposed portion arranged to traverse the channel and mate with the anchor, and the anchor further includes a rod handle coupled to the anchor rod and oriented to lie at about a right angle to the anchor rod.

19. The tiltable base of claim 18, wherein the support foundation also includes a handle retainer and the anchor rod is supported in the two rod mounts for rotation about an axis in a rotary direction to mate the rod handle of the anchor with the handle retainer of the support foundation to establish a fixed position of the anchor relative to the support foundation.

20. The tiltable base of claim 1, wherein the front portion of the support foundation is formed to include first and second arm-receiving channels located between first and second frame members and a channel partition located between the first and second arm-receiving channels, each of the first and second frame members and the channel partition includes a rod mount, each rod mount is formed to include a rod-receiving passageway, the anchor includes an anchor rod arranged to extend through the rod-receiving passageways of the rod mounts to define a first exposed portion of the anchor between the first frame member and the channel partition and a second exposed portion of the anchor between the channel partition and the second frame member, and the anchor grip mates with the first and second exposed portions of the anchor to retain the seat support in a selected angular orientation relative to the support foundation.

21. The tiltable base of claim 20, wherein the support foundation also includes a handle retainer and the anchor includes an anchor rod that is supported in the passageways of the rod mounts for rotation about an axis in a rotary direction and a rod handle that is coupled to the anchor rod to lie at about a right angle to the anchor rod and arranged to mate with the handle retainer of the support foundation upon rotation of the rod handle about the axis in the rotary direction to establish a fixed position of the anchor relative to the support foundation.

22. A tiltable base for supporting a child in a seated position in a vehicle, the tiltable base comprising
 a seat support adapted to carry a seated child,
 a support foundation coupled to the seat support for pivotable movement about a pivot axis, the support foundation including a channel partition, a first frame member that cooperates with the channel partition to define a first arm-receiving channel therebetween, and a second frame member that cooperates with the channel partition to define a second arm-receiving channel therebetween, and
 a releasable lock mechanism including an actuator mounted on the seat support for movement toward and away from the support foundation, the releasable lock mechanism further including an anchor including a first exposed portion coupled to the support foundation and arranged to extend into the first arm-receiving channel and mate with the actuator to limit pivotable movement of the seat foundation about the pivot axis relative to the seat support and a second exposed portion coupled to the support foundation and arranged to extend into the second arm-receiving channel and mate with the actuator to limit pivotable movement of the seat foundation about the pivot axis relative to the seat support.

23. The tiltable base of claim 22, wherein the actuator includes a first fastener arm arranged to extend in a first direction toward the support foundation, the first fastener arm is formed to include notches, and each notch is sized to receive the first exposed portion of the anchor therein upon pivoting movement of the seat support about the pivot axis to a selected angular orientation relative to the support foundation.

24. The tiltable base of claim 23, wherein the releasable lock mechanism further includes a spring arranged to bias the actuator normally to move toward the support foundation to position the exposed portion of the anchor in one of the notches to establish one of the locking positions and the first fastener arm includes a spring receiver arranged to open in a direction facing away from the support foundation and sized to receive an inner end of the spring.

25. The tiltable base of claim 24, wherein the spring further includes an opposite outer end arranged to engage a front panel of the seat support.

26. The tiltable base of claim 23, wherein the actuator further includes a pull handle coupled to the first fastener arm to locate the first fastener arm between the pull handle and the anchor and the spring is arranged to lie below the pull handle.

27. The tiltable base of claim 23, wherein the first exposed portion of the anchor is arranged to traverse the first arm-receiving channel, and the first fastener arm is sized and arranged to slide up and down in the first arm-receiving channel as the seat support is pivoted about the pivot axis to move relative to the support foundation.

28. The tiltable base of claim 23, wherein the anchor grip further includes a second fastener arm arranged to extend in the first direction toward the support foundation and lie in laterally spaced-apart relation to the first fastener arm, the second fastener arm is formed to include notches, and each notch is sized to receive the second exposed portion of the anchor therein upon pivoting movement of the seat support about the pivot axis to a selected angular orientation relative to the support foundation.

29. The tiltable base of claim 28, wherein the anchor includes an anchor rod that is arranged to extend through rod mounts formed in the channel partition and in the first and second frame members to define the first and second exposed portions of the anchor.

30. The tiltable base of claim 22, wherein the support foundation is formed to include two rod mounts arranged to lie in spaced-apart relation to one another, the first arm-receiving channel is located between the two rod mounts, the anchor is L-shaped and includes an anchor rod arranged to pass through the two rod mounts and traverse the first arm-receiving channel to define the first exposed portion, and the anchor further includes a rod handle coupled to the anchor rod and oriented to lie at about a right angle to the anchor rod.

31. The tiltable base of claim 30, wherein the support foundation also includes a handle retainer and the anchor rod is supported in the two rod mounts for rotation about an axis in a rotary direction to mate the rod handle of the anchor with the handle retainer of the support foundation to establish a fixed position of the anchor relative to the support foundation.

32. The tiltable base of claim 22, wherein each of the first and second frame members and the channel partition includes a rod mount, each rod mount is formed to include a rod-receiving passageway, the anchor includes an anchor rod arranged to extend through the rod-receiving passageways of the rod mounts to define the first exposed portion of the anchor located between the first frame member and the channel partition and the second exposed portion of the anchor located between the channel partition and the second frame member, and the actuator mates with the first and second exposed portions of the anchor to retain the seat support in a selected angular orientation relative to the support foundation.

33. The tiltable base of claim 32, wherein the support foundation also includes a handle retainer and the anchor includes an anchor rod that is supported in the passageways of the rod mounts for rotation about an axis in a rotary direction and a rod handle that is coupled to the anchor rod to lie at about a right angle to the anchor rod and arranged to mate with the handle retainer of the support foundation upon rotation of the rod handle about the axis in the rotary direction to establish a fixed position of the anchor relative to the support foundation.

34. A tiltable base for supporting a child in a seated position in a vehicle, the tiltable base comprising
   a seat support adapted to carry a seated child,
   a support foundation coupled to the seat support for pivotable movement about a pivot axis, and
   a releasable lock mechanism including an anchor coupled to the support foundation, an actuator mounted on the seat support for movement toward and away from the support foundation between locking positions to mate with the anchor to retain the seat support in a selected angular orientation relative to the support foundation and lock-releasing positions to disengage the anchor to allow movement of the seat support relative to the support foundation about the pivot axis, and a first spring arranged to bias the actuator normally to move toward the anchor to establish one of the locking positions, the actuator including a pull handle arranged to lie in spaced-apart relation to the support foundation and a first fastener arm coupled to the pull handle and arranged to extend in a direction toward the anchor coupled to the support foundation, the first fastener arm being formed to include notches and a first spring receiver arranged to lie below the pull handle, each notch being sized to receive a portion of the anchor therein upon movement of the actuator to one of the locking positions, the first spring being located in the first spring receiver and oriented to cause a first end of the first spring to engage the seat support and an opposite second end of the first spring to engage the first fastener arm.

35. The tiltable base of claim 34, wherein the releasable lock mechanism further includes a second spring arranged to bias the actuator normally to move toward the anchor to establish one of the locking positions and the actuator further includes a second fastener arm coupled to the pull handle and arranged to extend in a direction toward the anchor coupled to the support foundation, the second fastener arm is formed to include notches, each notch in the second fastener arm is sized to receive another portion of the anchor therein upon movement of the actuator to one of the locking positions, the second fastener arm is also formed to include a second spring receiver arranged to lie below the pull handle, and the second spring is located in the second spring receiver and oriented to cause a first end of the second spring to engage the seat support and an opposite second end of the second spring to engage the second fastener arm.

* * * * *